Sept. 7, 1948.  R. J. CASHMAN  2,448,518
PHOTOCELL
Filed April 7, 1944  5 Sheets-Sheet 1
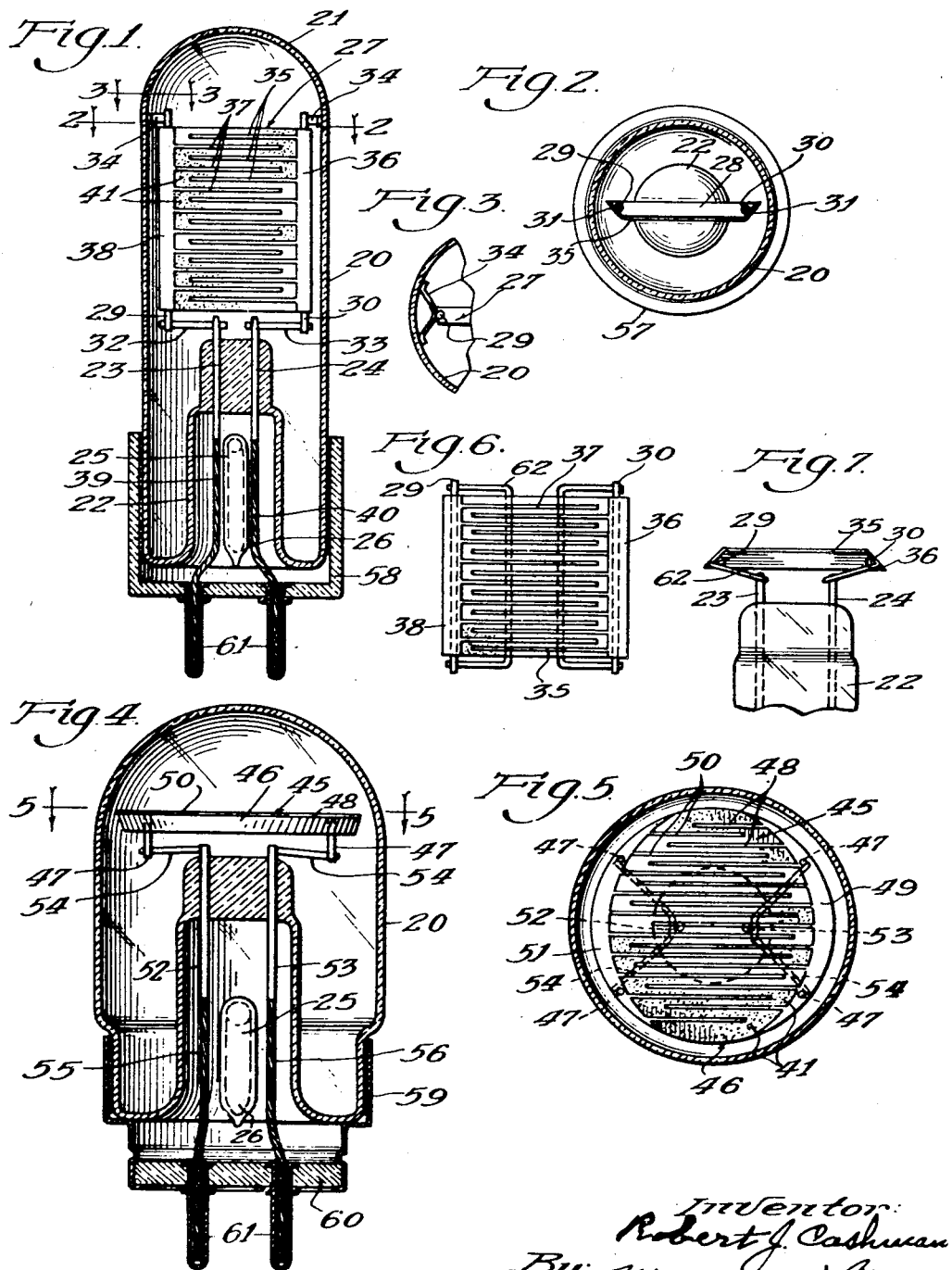

Sept. 7, 1948.  R. J. CASHMAN  2,448,518
PHOTOCELL
Filed April 7, 1944  5 Sheets-Sheet 2
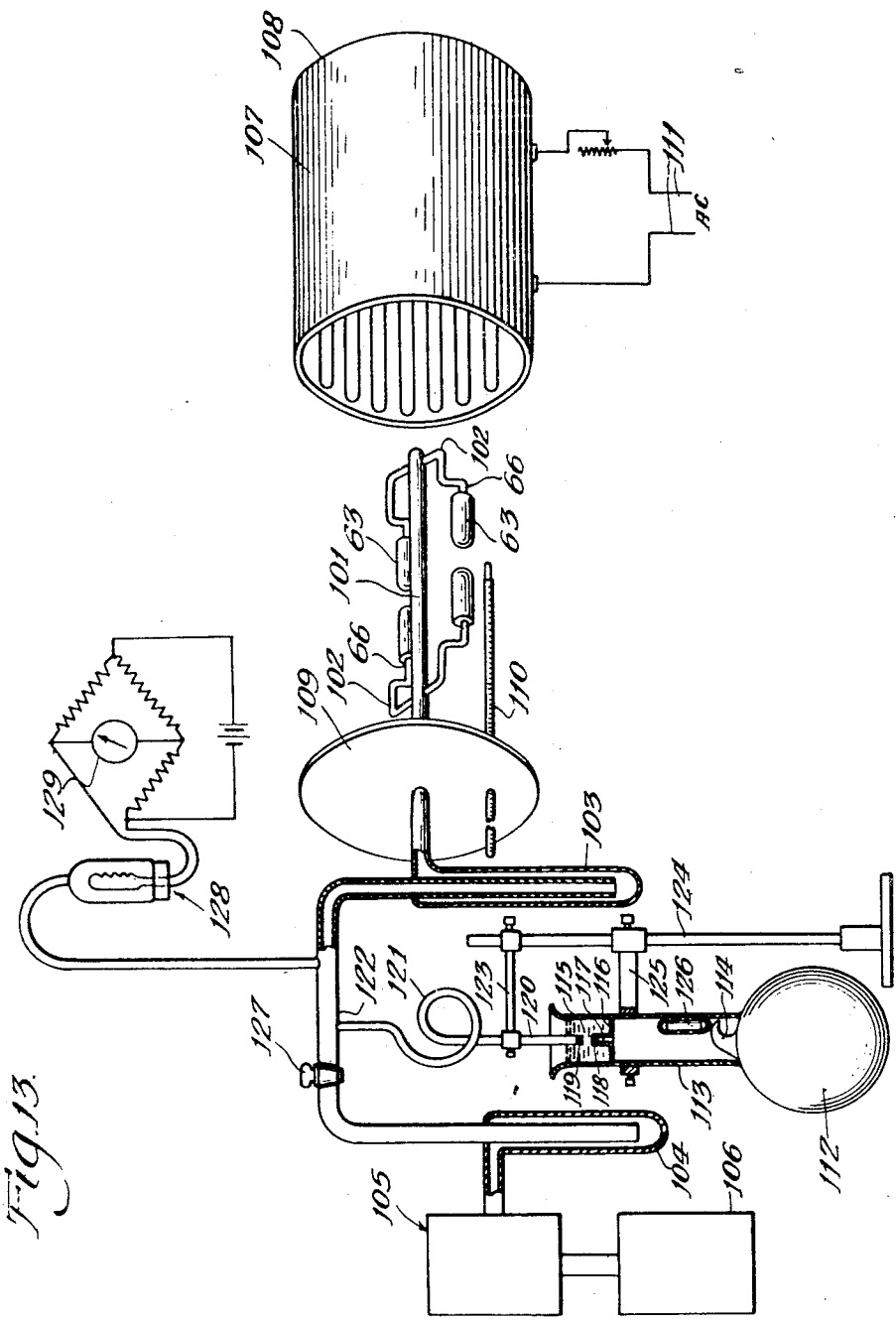

Sept. 7, 1948.　　　　　R. J. CASHMAN　　　　　2,448,518
PHOTOCELL
Filed April 7, 1944　　　　　　　　　　　5 Sheets-Sheet 3
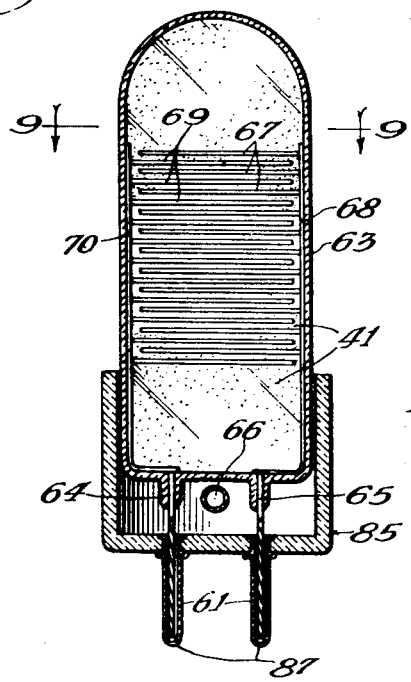
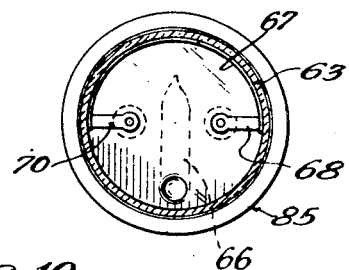
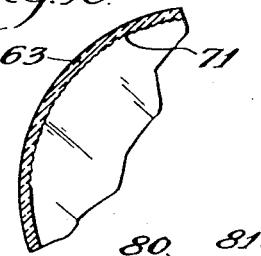
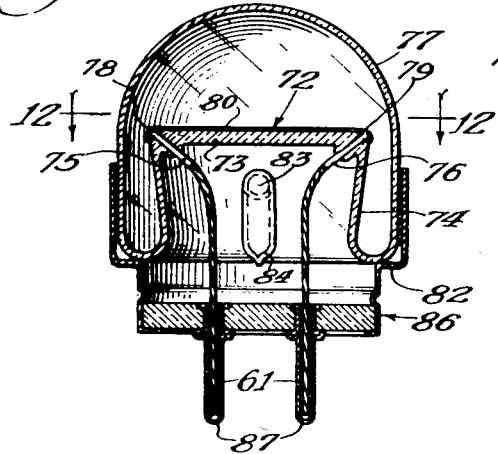
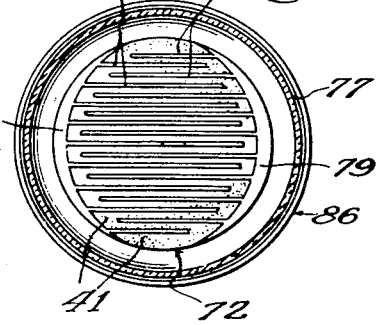
Inventor:
Robert J. Cashman
By: Mann and Brown
Attorneys

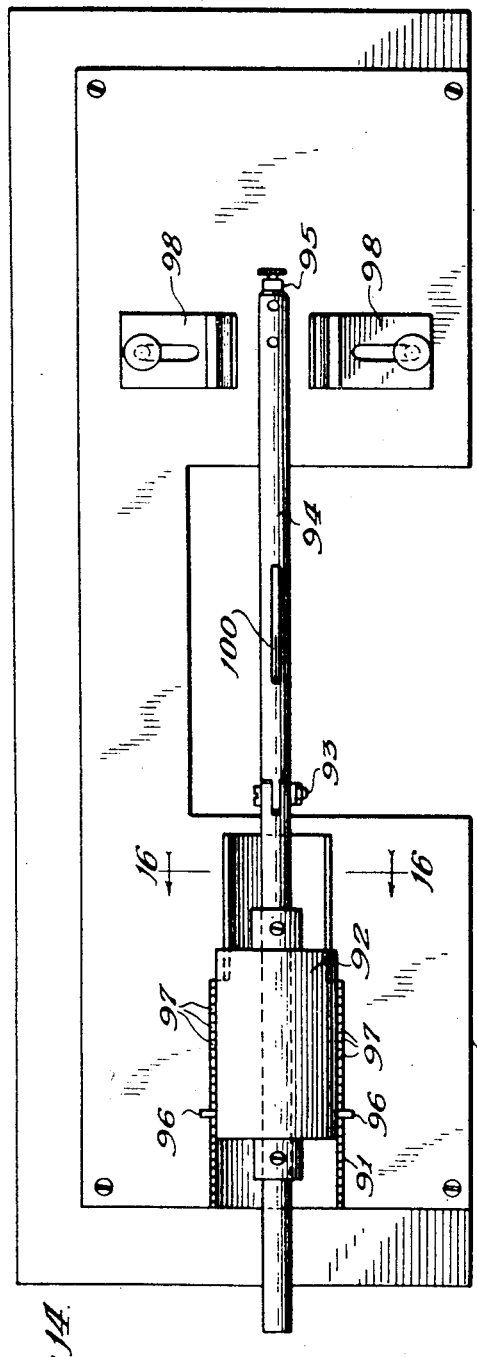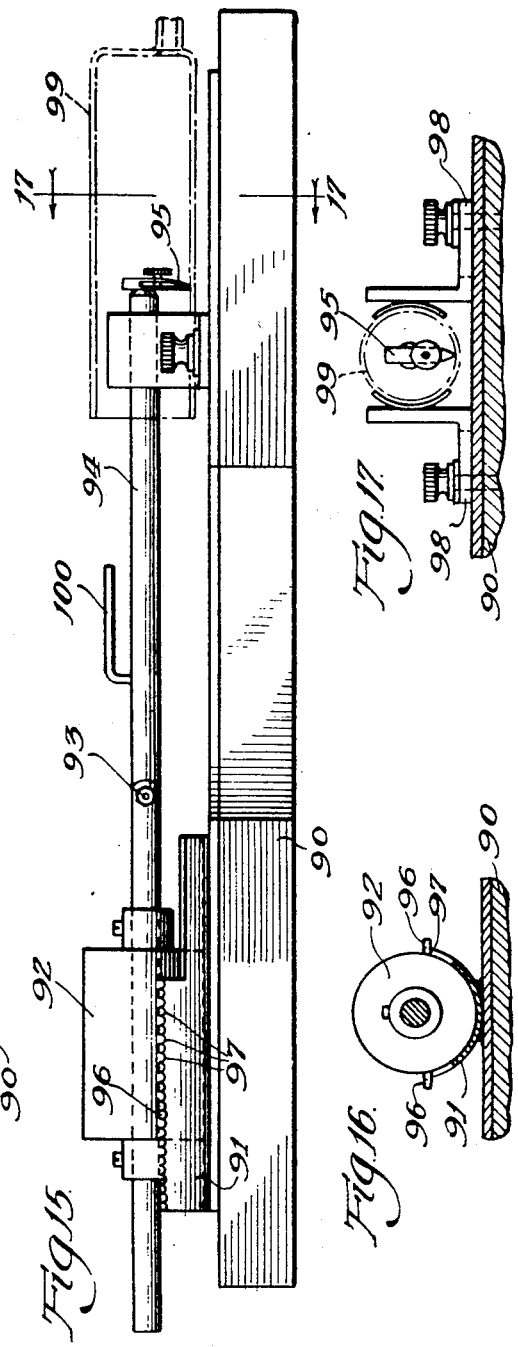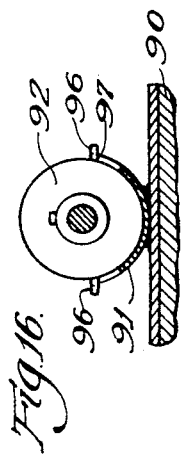

Sept. 7, 1948.  R. J. CASHMAN  2,448,518
PHOTOCELL
Filed April 7, 1944  5 Sheets-Sheet 5
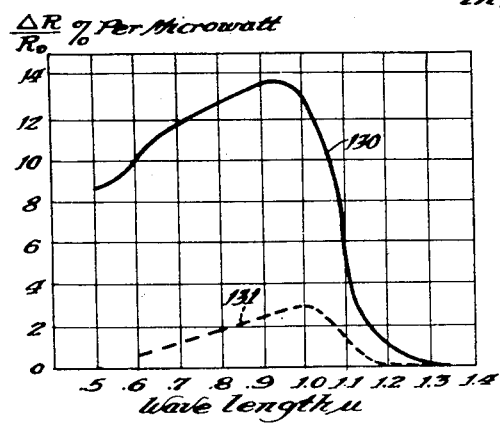
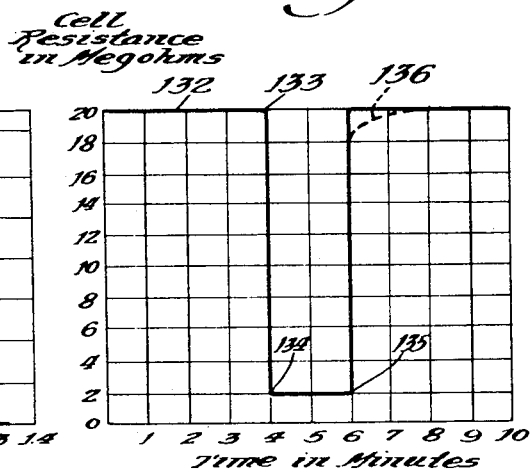
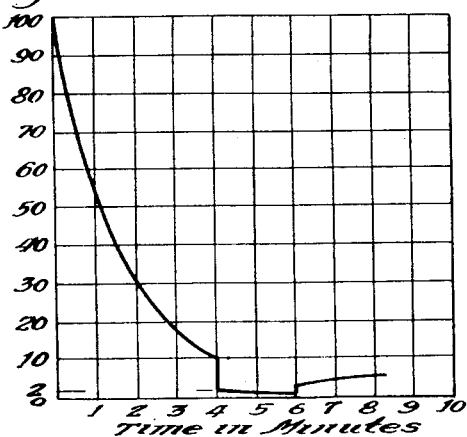
Inventor:
Robert J. Cashman
By: Mann and Brown
Attorneys Patented Sept. 7, 1948

2,448,518

UNITED STATES PATENT OFFICE 2,448,518

PHOTOCELL

Robert J. Cashman, Glenview, Ill., assignor to Northwestern University, a corporation of Illinois Application April 7, 1944, Serial No. 530,038

12 Claims. (Cl. 201—63)

1

This invention relates generally to photoelectric or photo-sensitive cells, of which there are three types: photo-resistive or photo-conductive, photo-emissive, and photo-voltaic. Selenium cells are typical of the photo-resistive type of cell, and their operation is based upon the fact that the electrical resistance of selenium is functionally related to the intensity of the light falling upon the cell. In the photo-emissive cell, such light sensitive substances as sodium, potassium, or cesium are placed in series with an electromotive force, and light falling upon these substances has the effect of causing electrons to be emitted from the surface of the metal in such manner that the total current through the circuit is functionally related to the intensity of the light falling upon the cell. The photo-voltaic cell converts light energy into electrical energy directly without the assistance of an external electromotive force.

Although this invention has certain applicability to all three types of photo-sensitive cells, the more specific aspects of the invention relate to the photo-resistive or photo-conductive type of cell, and for the purpose of this disclosure the invention will be described with particular reference to that type of cell.

It is known that thallium sulfide, or more particularly thallous sulfide has unusual photoelectric properties and is particularly responsive to radiations in the infra-red region of the spectrum, but heretofore photocells employing thallous sulfide have not been reliable in operation because of their inherent instability. I have discovered how to produce thallous sulfide photocells which are stable over long periods of time and which have other unusual desirable operating characteristics.

Some of the principal objects of the invention, therefore, are: To produce a photocell of the photo-conductive variety which is particularly sensitive to radiations in the infra-red region of the spectrum; which is inherently stable and does not lose its sensitivity when exposed to strong light intensities; which has a dark resistance that is sufficiently low that it may be used effectively with thermionic amplifying apparatus and still have the required sensitivity to radiations in the infra-red region of the spectrum, particularly between 8,000 and 13,000 angstroms; which has an extremely low noise factor as compared with other cells of this type, and which can be produced economically in quantity production.

Other objects and advantages will become apparent as the disclosure proceeds and the description is read in conjunction with the accompanying drawings, in which Fig. 1 is a vertical sectional view showing one form of photocell employing my invention;

Fig. 2 is a horizontal sectional view taken on the line 2—2 of Fig. 1;

Fig. 3 is a fragmentary sectional view taken on the line 3—3 of Fig. 1, showing the manner in which the photo-sensitive element is braced against the wall of the envelope which encloses it;

Fig. 4 is a vertical sectional view showing another form of my invention in which the photo-sensitive element is disposed transversely to the longitudinal axis of the tube;

Fig. 5 is a horizontal sectional view taken on the line 5—5 of Fig. 4;

Fig. 6 is a plan view showing another way in which the photo-sensitive element may be supported within the photocell tube;

Fig. 7 is an elevational view of the form of the invention shown in Fig. 6;

Fig. 8 is a vertical sectional view showing what is now considered to be a preferred form of the invention;

Fig. 9 is a horizontal sectional view taken on the line 9—9 of Fig. 8;

Fig. 10 is an enlarged fragmentary view showing the manner in which a portion of the interior wall of the photocell envelope may be roughened or ground to receive the grid lines;

Fig. 11 is a vertical sectional view showing another form of the invention;

Fig. 12 is a horizontal sectional view taken on the line 12—12 of Fig. 11;

Figure 13 is a schematic drawing showing the apparatus used in making the photocells;

Fig. 14 is a plan view showing the ruling apparatus used for applying the grid in the form of the invention shown in Figs. 8 and 9;

Fig. 15 is an elevational view of the same;

Figs. 16 and 17 are vertical sectional views taken on line 16—16 and 17—17 of Figs. 14 and 15, respectively;

Figs. 18-20 inclusive are graphs illustrating diagrammatically the physical characteristics of cells in accordance with the present invention as compared with those of the prior art.

At the outset, it should be understood that the description of certain preferred forms of the invention is for the purpose of disclosure only and should not be construed as limiting the appended claims, except as may be required by the prior art.

It should also be understood that I do not wish to be limited to the theory which may be expounded in this specification for the purpose of explaining the possible or probable basis for certain phenomena and facts known to exist. Many of the results which I have been able to attain cannot be explained with known theory, and it is the desirable operating characteristics of the cell and the method of making cells of this type which I desire to protect by Letters Patent.

*Physical structure of the photocells*

In the form of the invention shown in Figs. 1-3, inclusive, the photocell comprises an envelope 20, preferably made of a high melting point borosilicate glass such as Nonex or Pyrex glass, both of which readily transmit in the infra-red region of the spectrum, the top of the envelope being closed at 21 and the bottom of the envelope having a re-entrant portion 22 through which electrodes 23 and 24, preferably of tungsten, are pinch-sealed. A small glass tube 25 is sealed into the re-entrant portion 22 of the envelope to permit the envelope to be suitably evacuated and, if desired, gas filled. The tube 25 is sealed off at 26 after the cell has been appropriately processed, as hereinafter described.

Mounted upon the electrodes 23 and 24 is a photosensitive element generally designated 27 which comprises a glass plate 28, also preferably of Nonex or Pyrex glass, into the two sides of which tungsten conductors 29 and 30 are sealed. The plate may be flat as shown, or may be curved to conform more or less with the adjacent envelope wall. The glass plate is then beveled off by grinding, as shown at 31, to expose the length of the conductors 29 and 30; and these conductors also project above and below the glass plate 28, as best shown in Fig. 1. The projection of the conductors 29 and 30 below the plate 28 forms a convenient means by which the photo-sensitive element 27 may be mounted upon the electrodes 23 and 24, and the supporting rods of nickel 32 and 33 are spot-welded to the conductors 29 and 30 and the electrodes 23 and 24, respectively, to support the photo-sensitive element in place.

The upper projecting portions of the conductors 29 and 30 have small spring clips 34, preferably of molybdenum, spot-welded thereto for the purpose of furnishing additional support to the photo-sensitive element 27 within the envelope (see Fig. 3).

Due to the relatively high resistivity of thallous sulfide, it is necessary, for practical reasons, to employ a grid on the photo-sensitive element in order to hold down the dark resistance of the cell as a whole. The grid may be formed in various ways, but it consists essentially of a plurality of parallel, relatively fine conducting lines with all even numbered lines connected to one terminal of the photo-sensitive element and all odd numbered lines connected to the other terminal of the element. The two sets of intercalated conducting lines in effect break up the photo-sensitive surface into a plurality of parallel connected resistances, so that the overall resistance of the cell is kept within the desired limits.

Referring now to Fig. 1, it will be seen that the plate 28 has a grid applied to one of its faces, and this grid comprises a plurality of odd numbered, relatively fine conducting lines 35, the ends of which are connected by a relatively broad conducting line 36, and a plurality of even numbered, relatively fine conducting lines 37 with their ends connected at the opposite margin of the plate by a relatively broad conducting line 38.

The conducting lines may be graphite applied by lead pencil or deposited from an aqueous colloidal graphite suspension. The lines may also be formed of gold, platinum, or any other suitable conducting material which lends itself to application in relatively fine lines. The relatively broad conducting lines 38 and 36 applied to the side margins of the plate 28 are in intimate electrical contact with the exposed portions of the conductors 29 and 30 respectively, which, in turn, are connected through the nickel carrier rods 32 and 33 and the electrodes 23 and 24 with external leads 39 and 40.

Further details of the grid and its method of application will be described later on with particular reference to its bearing upon certain operating characteristics of the photocell, but, for the present, it will be sufficient to understand that the photo-sensitive material, whether it be thallous sulfide or some other material, is applied over the grid to complete the photo-sensitive element 27, as indicated at 41.

In the form of the invention shown in Fig. 4, the photo-sensitive element, generally designated 45, is mounted in a plane that is normal to the axis of the photocell. The element consists of a glass plate 46, preferably of Nonex or Pyrex, through which at least two, and preferably four, tungsten conductors 47 are sealed. The upper ends of the conductors 47 are ground off flush with the top of the glass plate 46, and the grid is applied to the top surface of the plate in much the same manner as described with reference to the form of the invention shown in Figs. 1-3, inclusive. The relatively fine conducting lines comprise odd numbered lines 48 connected at their ends by a relatively broad conducting line 49, which is in intimate electrical contact with the exposed ends of the conductors 47 sealed through the right side (Fig. 5) of the plate 46. The even numbered conducting lines 50 of the grid are connected at their ends by a relatively broad conducting line 51, which likewise is in intimate contact with the exposed ends of the conductors 47, sealed through the left side (Fig. 5) of the plate 46. As before, the photo-sensitive material is then deposited upon the surface of the grid, as will hereinafter be described.

The photo-sensitive element 45 is supported on the electrodes 52 and 53 by nickel carrier rods 54, which are spot-welded to the lower ends of the tungsten conductors 47 and the upper projecting ends of the electrodes 52 and 53. The lower ends of the electrodes 52 and 53 are connected to external leads 55 and 56, respectively.

In both forms of the invention—i. e., the form shown in Figs. 1-3 inclusive, and the form shown in Figs. 4 and 5—the cell envelope is preferably based to protect the cell and provide a convenient means for mounting the cell in an operating circuit. It is important, however, for the leads to be well insulated from each other due to the high resistance characteristics of the cell, and to this end the base 58 may be formed, as in Fig. 1, of polystyrene or Isolantite, both of which are non-hygroscopic and of relatively high resistance. When a metal base is used such as 59 (Fig. 4), a bottom plate 60 is employed to provide the desirable high resistance characteristics. The bases are provided with base pins 61, as is common.

A slightly modified mounting for the photo-sensitive element is shown in Figs. 6 and 7, and in this form of the invention the photo-sensitive element is made in exactly the same manner as the element 27 (Figs. 1-3, inclusive), but the element is mounted in a plane normal to the axis of the cell. In this instance, the projecting ends of the conductors 29 and 30 are spot-welded to nickel carrier rods 62, which, in turn, are spot-welded to the electrodes 23 and 24. The carrier rods 62 are U-shaped, as best shown in Fig. 6, and constitute a convenient means for mounting the photo-sensitive element on the supporting electrodes.

The form of the invention shown in Figs. 8 and 9 is at present preferred because of the simplicity of its structure and because in some respects it has better operating characteristics.

The photocell comprises an envelope 63 closed at its upper end and having tungsten electrodes 64 and 65 sealed through the bottom wall of the envelope. As before, the envelope is preferably made of a high melting point glass, such as Nonex or Pyrex. An exhaust tube 66 is also sealed into the bottom wall of the envelope to enable the cell to be evacuated and processed in a manner later to be described. After the cell has been processed, the exhaust tube 66 is sealed off in a conventional manner.

In this instance, the photo-sensitive element is formed on the inside wall of the envelope itself, and preferably extends around one half of the envelope periphery. The grid is applied to the inside wall of the envelope in any convenient manner, preferably by ruling with an aqueous colloidal graphite suspension. As before, the odd numbered grid lines 67 have their ends connected by a relatively broad conducting line 68, which extends vertically along the interior side wall of the envelope and then horizontally over the exposed and ground off inner face of the electrode 65. Likewise, the even numbered grid lines 69 are connected at their ends by a vertical, relatively broad conducting line 70, which at its lower end extends laterally along the bottom wall of the cell envelope over the exposed and ground off end of the electrode 64. The photo-sensitive material 41 is then deposited over the grid and activated to complete the photosensitive element.

When colloidal graphite is used for making the grid line 67, the inside surface of the envelope wall may be left in its normal glazed finish; but, when a lead pencil is used for forming the grid, it is necessary to roughen the portion of the envelope which is to receive the grid, as indicated in Fig. 10 at 71.

One advantage of the type of photocell shown in Figs. 8, 9, and 10 is that the cell will respond to radiations from any direction within a plane normal to the axis of the cell. Although the cell shown in Fig. 1 will respond to radiations entering the cell from either side of the plate 28, it will not respond to radiations which enter the cell along the lateral side edges of the photo-sensitive element 27. In the cell shown in Figs. 8–10, however, the radiations may come from any direction within a plane normal to the axis of the cell, and this 360 degree responsiveness of the cell makes it desirable for certain types of applications. Of course, the radiations need not necessarily be within a plane normal to the axis of the cell provided there are components which lie in such plane.

The photocell shown in Figs. 11 and 12 is of the end-on variety with its photo-sensitive element 72 lying in a plane normal to the axis of the cell. It is formed on the closed and flattened end 73 of a Pyrex or Nonex tube 74. Tungsten electrodes 75 and 76 are sealed angularly through opposed margins of the wall 73, and the ends of the electrodes projecting into the encasing envelope shell 77 are ground off, after which a grid consisting of broad terminal lines 78 and 79, connecting the ends of even numbered grid lines 80 and odd numbered grid lines 81, respectively, is applied to the interior surface of the wall 73.

The lower end of the tube 74 is flared outwardly, as indicated at 82, where it is sealed to the encasing envelope 77. An exhaust tube 83 is sealed into the reentrant portion of the cell for exhausting and other processing of the cell. After processing, it is sealed off, as indicated at 84.

The photocells shown in Figs. 8 and 11 are also appropriately based as indicated at 85 and 86, respectively, and the lead wires welded to the electrodes of the cells extend through the base pins, to the bottom of which they are soldered, as indicated at 87.

*Preparation of thallous sulfide*

Thallous sulfide may be prepared in various ways, although there are only two which are fundamentally different. The first method starts with commercial thallium sticks which are heavily oxidized. These are melted down in a glass vacuum system, during which time the oxide breaks down (about 300 degrees centigrade). The molten material is carefully poured into a connecting chamber, leaving behind a certain amount of slag material which sticks to the glass. This process is repeated by pouring the thallium into another connecting chamber following the first one, and finally pouring it into a long connecting tube, where it is allowed to freeze. During these operations, the pressure is maintained at a few microns. The tube containing the silvery white thallium is then removed from the vacuum system and a known portion is then introduced into one side arm of another chamber (a tube with two side arms). A second side arm contains sulphur previously fused from chemically pure flowers of sulphur. The mass of sulphur employed is dependent upon the mass of thallium selected and is determined in the following way: The thallium sulfide molecule ($Tl_2S$) contains by weight 92.73% thallium. The mass of sulphur placed in the side arm is such that there is a slight excess of thallium actually about 13 parts thallium to one of sulphur by weight. This is done to assure that the end product will be $Tl_2S$ rather than some intermediate compound or product between $Tl_2S$ and $Tl_2S_3$, as would be the case were an excess of sulphur present. The chamber is evacuated and the thallium is again melted down. Any oxide which has formed breaks down. The sulphur is gently heated to drive off air and water vapor, and finally the chamber is sealed off. The melted thallium is allowed to run into the main chamber, and the sulphur is slowly vaporized from the side tube. The melted thallium reacts with the sulphur vapor very rapidly and forms a compound of higher melting point. The temperature in the main tube must be raised to about 460 degrees Centigrade before the new compound melts. Finally, all of the sulphur is evaporated and taken up by the free thallium. After several minutes, it will be observed that there is a small amount of liquid at the bottom which has more of a metallic appearance than the remaining liquid above. Chemical analysis shows that the heavier liquid is practically pure thallium while the lighter liquid is $Tl_2S$. After cooling to room temperature, a portion of the solidified Tl₂S is crushed in a mortar to a fine powder and stored in an evacuated container for future use in the cells.

The second method of preparation starts with commercial thallium nitrate or sulfate. About ten grams is dissolved in twice distilled water and recrystallized from solution three times. This is dissolved in about 500 cc. of twice distilled water. Precipitation is carried out with hydrogen sulfide prepared from iron sulfide and dilute hydrochloric acid. The H₂S is passed over moist pumice and then washed with distilled water prior to use. Two or three cc's of ammonium hydroxide are added to the solution to keep it alkaline during the precipitation of the sulfide. The H₂S is bubbled through the solution until precipitation stops. The precipitate is filtered on a sintered glass crucible connected to a water aspirator, then washed with H₂S water, and finally distilled water. It is stored in an evacuated desiccator over P₂O₅ to dry. Part of the black Tl₂S powder is then fused in vacuum in a hard glass fusion tube. When cold, the bead is crushed in a mortar and stored in vacuum prior to use.

In some practices of my invention, I find it desirable to take steps to remove such metallic impurities as lead, antimony, and copper. This is done in any well known manner, but I prefer to accomplish this result by using H₂S to precipitate out these impurities from an acid solution of the nitrate or sulfate. The precipitate is then filtered out and the solution made alkaline, after which the process continues as heretofore described.

*Method of constructing and processing a photocell*

In order to produce stable, highly sensitive photocells, great care must be exercised in the construction and processing of the cell. While it is possible to obtain stable cells which have a higher degree of sensitivity than those heretofore known without difficulty by the practice of my invention, it is only with the exercise of great care and precision in constructing and processing the photocell that one is able to produce a stable photocell of extremely high sensitivity. Hence, it should be understood that for many applications of my invention, particularly those in which super-sensitive cells are not required, not all steps of the hereinafter described fabrication of the cell need be slavishly followed; and, even when super-sensitive cells are desired, some modification of the processing is possible.

To illustrate a preferred method of making a photocell, let us consider, first, the step by step process by which the cell shown in Figs. 8 and 9 is constructed and processed.

I first start with a piece of Nonex or Pyrex tubing, about 3 inches long and about 30 millimeters in diameter, and the bottom end is closed and flattened. The exhaust tube 66 is sealed into place, as are also the electrodes 64 and 65, after first being beaded with glass and ground off flush at their upper ends. If the grid is to be applied with a lead pencil, the inside surface of the tube which is to receive the grid is at this time ground with 600 mesh carborundum. The envelope is then thoroughly cleaned by scrubbing, and then washed repeatedly with hot water. The exposed ends of the electrodes 64 and 65 are then cleaned electrolytically, using a sodium hydroxide solution. After rinsing the tube out with hot water, a cleaning solution composed of sulphuric acid and potassium dichromate is used. This is flushed out with hot water again, and the envelope is then dropped into a 1% solution of hydrofluoric acid, where it is left for about 15 seconds, and then thoroughly washed several times with boiling distilled water. It is then placed in an oven to dry. The envelope is now ready to receive the grid.

As stated before, if the grid is to be applied by pencil, it must be upon a ground surface, as indicated at 71 in Fig. 10, but if the grid lines are to be deposited from a colloidal graphite suspension, or from some other metallic colloidal suspension, or if the grid lines are to be applied by evaporating the metal onto the wall through a stencil, the interior surface of the envelope may be left in its natural state. I have found that for the best results a commercial product known as Aquadag, manufactured by the Atcheson Colloidal Graphite Company, of Port Huron, Michigan, should be used, this product being an aqueous colloidal graphite suspension. Among other things, it has the property of being chemically inert to thallium sulfide, which makes it preferable to other conducting materials, such as gold or platinum, which appear to alloy with thallium sulfide to some extent. However, gold, platinum, or the like may be used if covered with Aquadag, or if the gold, platinum, or similar conducting material is applied in sufficiently heavy coatings, as, for example, by evaporation onto the glass wall through a stencil, a satisfactory cell may be obtained without an over coating of Aquadag.

When the grid is applied to the cell by ruling, as distinguished from evaporation through a stencil, it is convenient to use a device such as shown in Figs. 14–17, inclusive. This device consists of a base 90 having a semi-cylindrical bearing 91 at one end adapted to receive a relatively heavy cylindrical bearing 92, which is connected through a hinged joint 93 with an arm 94 carrying a bow pen or other marker 95 at its extreme end. The cylinder 92 is provided with laterally extending trunnion pins 96, which are adapted to snugly seat within notches 97 provided along the upper surface of the semi-cylindrical bearing 91. The notches are spaced apart a distance corresponding to the distance desired between grid lines, which, preferably, is about one-fifteenth of an inch.

The cell which is to receive the grid ruling is clamped to the base 90 by adjustable clamps 98, which firmly hold the envelope 99 in an appropriate position to receive the end of the arm 94 and the bow pen 95. The lines are ruled onto the interior surface of the envelope 99 by rotating the arm 94 and the associated bearing 92, and a handle 100 is provided for convenience of manipulation. After a grid line has been ruled, the bearing 92 is moved rearwardly a notch and the next line ruled, and the procedure continues until the desired number of lines has been ruled to produce a cell of the desired resistance values and target area.

In using Aquadag, or any similar conducting material, the suspension should be as concentrated as possible without interfering with proper flowage of the material through the bow pen 95.

After the grid lines 67 and 69 have been ruled onto the envelope, the conducting lines 68 and 70 (Fig. 8) are applied to the envelope. These lines are also preferably of Aquadag, and they extend down the sides of the envelope and laterally over the adjacent electrode. These lines are preferably applied by brush.

It should be understood that the Aquadag may be satisfactorily applied to the interior surface of the envelope only after the envelope has been thoroughly cleaned, as, for example, by the cleaning steps heretofore set forth.

After the grid has been applied to the envelope and electrically connected to the electrodes, the cell is ready for a preliminary baking out. The tubes are heated to 500 degrees centigrade fifteen to twenty minutes to remove any organic material present in the Aquadag, and then the upper end of the envelope is sealed off. The envelope is then connected to a vacuum and processing system such as shown in Fig. 13, the connection being made through the exhaust stem 66.

As shown in Fig. 13, the apparatus used in this stage of the process consists of a glass manifold 101 having a plurality of branches 102 adapted to be connected to the exhaust stems 66 of the cells being processed. The manifold 101 is connected through liquid air traps 103 and 104 to a mercury diffusion pump, generally designated 105, which may be of conventional design and capable of producing a vacuum of $10^{-6}$ millimeters when connected in series with a mechanical vacuum pump 106. A resistance oven 107, closed at 108, can be slipped over the manifold 101 and the cells that are being processed until it engages the cover 109, and a thermometer 110 projects through the cover 109 so that the temperature within the oven may be readily ascertained at any given time. The oven is connected by leads 111 to any suitable source of electrical power.

After the cells have been connected to the manifold 101, the oven 107 is moved into place and the cells are heated to 550 degrees centigrade with the pumps 105 and 106 operating continuously at all times. After the cells are thoroughly baked out in this manner, they are ready to receive the thallium sulfide powder which has been prepared in the manner heretofore described. The purpose of this baking out is to remove from the interior of the envelope all impurities which may be contained therein, including, particularly, vapor and gases occluded in the glass envelope.

The cells are then removed from the manifold by opening the exhaust stems 66, and approximately 15 milligrams of thallous sulfide, prepared as heretofore described, is introduced into each envelope through the exhaust stem 66, preferably while the envelope is being held in a horizontal position with the grid positioned above. The thallous sulfide is shaken so that it is well distributed along the length of the cell beneath the grid, and the exhaust tube 66 of each cell is again connected to the manifold 101. After the cells are sealed on and time has been allowed for the pumps 105 and 106 to exhaust the cells, the oven is again slipped in place and the cells are heated to a temperature of about 425 degrees centigrade, keeping the pumps at all times in full operation. The oven is then removed and the cells allowed to cool in air, still being continuously evacuated. When cool, the thallium sulfide is evaporated with a gas air burner, and the thallium sulfide condenses over the grid. The cells are then allowed to cool to room temperature, and the cells are then ready to be activated. At this stage, the cells have very little sensitivity to radiant energy.

An alternate method for forming the thallium sulfide deposit on the grid is by introducing thallium and sulphur into the cell separately and causing the reaction to take place in situ. A given amount of thallium is evaporated in the evacuated cell and deposited on the grid in a thin layer in the same manner as $Tl_2S$, and then a limited amount of sulphur vapor, either in a pure, uncombined state or a combined state such as $H_2S$, is permitted to come in contact with the thallium while the cell is heated to a temperature of about 280° C. The reaction is allowed to take place until the electrical resistance of the cell reaches a maximum, at which time the sulphur vapor is cut off.

The activation stage of the process is a very important one, because it is in this stage that the desired operating characteristics of the cell are attained. It is a peculiar property of thallous sulfide that it reaches its maximum sensitivity to radiant energy when oxidized and heat treated to some definite limited degree. Any oxidation or heat treatment which falls short of the desired amount, or exceeds such value, results in a cell which will not have maximum sensitivity.

There are various ways in which photo-sensitization may be effected. The quantity of oxygen permitted to come in contact with the thallous sulfide, the temperature to which the material is raised, and the time permitted for oxidation are all factors, in determining the extent to which the activation takes place. It should, therefore, be understood that in citing a specific example of how the activation may be effected the example is purely by way of illustration and that the procedure may be varied, giving appropriate consideration to the three factors mentioned above which affect the extent of activation.

When making a super-sensitive cell—i. e., a cell having above average sensitivity—it is sometimes desirable to determine empirically the exact conditions for activation consistent with the knowledge that limited oxidation is required and the further fact that there are sometimes variations in the physical properties of different batches of thallous sulfide even though prepared in apparently identical ways.

An example of a procedure for activation to produce cells of average sensitivity is as follows: After the thallous sulfide has been deposited on the grid by evaporation, as heretofore described, and the cell has been continuously kept under high vacuum, a sufficient amount of spectroscopically pure and thoroughly dry oxgen is permitted to enter the system, and hence the cell, to establish a pressure of approximately $\frac{1}{10}$ millimeters of mercury, and concurrently therewith the oven 107 is moved into place over the manifold 101 to bring the temperature up to approximately 260 degrees centigrade, at which temperature it is maintained for about 15 minutes. At this point, the oven may be removed and the cell permitted to cool to room temperature while still leaving the cell subjected to the oxygen pressure; but, if a cell of higher resistance and sensitivity is desired, the cell should be evacuated concurrently with the removal of the oven.

The oxygen may be admitted to the cell in the following manner: A flask 112 of spectroscopically pure oxygen has an elongated neck 113 telescoped over the sealed off tip 114 of the flask. Adjacent to the upper portion of the neck 113, a mercury chamber 115 is formed by sealing into the neck of the flask a partition 116 having an upwardly extending tubulature 117, to the end of which a porcelain disk 118 of fine porosity is fused. Adjustably supported above the disk 118 is a similar disk 119 made of the same material and fused to the end of a glass arm 120 connected through a bend 121 with the exhaust system, as indicated at 122. The arm 120 is held in the desired position by a clamp 123 mounted on a stand 124, the latter also supporting the neck 113 of the flask 112 by means of a clamping arm 125.

As long as the disk 119 is held in the position in which it is shown in Fig. 13—i. e., spaced substantially from the disk 118—the mercury in the chamber 115 effectively blocks the flow of gases through either of the disks 118 or 119. It should be understood that this is so even though the tip 114 has been broken off by magnetically raising and then dropping a small, glass enclosed, iron armature 126 located within the neck 113 of the flask, thus allowing oxygen from the flask to enter the neck 113. The flask 112 is originally at atmospheric pressure.

By lowering the arm 120 so that the disk 119 comes in contact with the disk 118, the mercury is forced away from the faces of these disks, and oxygen is permitted to flow slowly into the exhaust system through the tube 120.

When oxygen is to be admitted to the manifold 101, a stopcock 127 is closed, which disconnects the vacuum pump from the manifold, and the tube 120 is then lowered in the chamber 115 to permit a flow of oxygen into the manifold 101. The desired pressure may be obtained by means of a Pirani gauge, generally designated 128, which is connected by a tube to the exhaust system, and which includes a meter 129 calibrated to show pressures.

After sufficient oxidation and heat treatment has been effected within the cells attached to the manifold 101, the stopcock 127 is again opened, it being understood, of course, that the tube 120 through which oxygen is admitted has been raised to the position shown in Fig. 13 as soon as the desired pressure has been reached, in which position the oxygen supply is disconnected from the vacuum system.

After the activation of the thallous sulfide has been effected in the manner described above, or in any other suitable manner consistent with this disclosure, the cells are either evacuated and sealed off or a suitable inert gas fill, such as helium or argon, is introduced after evacuation of the oxygen.

Another example of how activation may be effected consists in first admitting oxygen to a pressure of 20 microns while the cells are at room temperature and then baking the tubes at approximately 230 degrees centigrade for about 15 minutes with the oxygen kept at that pressure. The oven is then removed and the cells allowed to cool to room temperature, after which the oxygen is pumped out and the cells are again heated by the oven to approximately 360 degrees centigrade, the cells being kept under high vacuum during this operation. When the cells have reached a temperature of 360 degrees centigrade, about $\frac{2}{10}$ of a millimeter of oxygen is introduced into the cells for a period of approximately 15 seconds. The oven is then removed and the oxygen pumped out simultaneously. The cells are then thoroughly evacuated and sealed off, or evacuated and gas filled, as before.

There is some evidence that in both of the illustrative procedures for activation given above, a part of the oxygen treatment is strictly a chemical oxidation process and a part is more or less of an absorption of oxygen by the thallous sulfide. This probably takes place in any successful activation of thallous sulfide.

Physical characteristics of the photocells

The physical characteristics of a photocell produced in accordance with my invention show outstanding advantages over cells which have heretofore been produced using thallous sulfide as the photo-sensitive material. These characteristics include sensitivity, stability, dark resistance, frequency response, noise level, etc., which will hereinafter be separately considered.

Sensitivity

The full line curve 130 in Fig. 18 shows the response of a cell made in accordance with my invention to an equal energy spectrum, and the dotted line curve 131 in the same figure shows a similar curve for typical prior art thallous sulfide cells. It will be observed that the thallous sulfide cells, both of the prior art and of my design, have their peak response at about 1 mu, but the significant thing about the curves shown in Fig. 18 is the fact that my cell has a sensitivity, on the average, which is several times that of prior art cells, as indicated by the difference in the ordinates between the two curves. Actually, I have been able to construct cells in accordance with my method having sensitivities which are many times that of the prior art cells. For example, if one considered the ratio of the dark resistance of a cell to the resistance effected by a ¼ foot candle illumination produced by a tungsten filament lamp, the prior art cells will show a sensitivity based upon this ratio which may have a factor of around 2, whereas in my cell, computed on the same basis, the factor may average 6 or more. On occasions, considerably higher factors have been obtained.

It should be understood that in the spectral response curve shown in Fig. 18, the abscissa represents wave length, and the ordinates represent the percentage of change in resistance per microwatt of energy.

Stability

One of the outstanding characteristics of my cell is its inherent stability. So far as I am aware, prior art cells have always shown a drift in their dark resistance; and, after exposure to light sources of any substantial intensity, such, for example, as ordinary room light, the dark resistance will drop to a relatively low value and gradually drift back over a period of possibly months, if at all, to higher values. By way of contrast, my cell has a stable dark resistance and may be exposed to room light, or even stronger light, and the dark resistance will remain the same, or at least will recover within a period of a very few minutes.

It should be understood that the fatigue effects which appear in the prior art cells are apparently of two kinds: electrical fatigue and light fatigue. The electrical fatigue is evidenced by a drop in dark resistance when a voltage is applied to the cell. Light fatigue is evidenced by the pronounced drop in the dark resistance of the cell after exposure to a light source.

These characteristics of prior art cells and cells made in accordance with my invention are illustrated in Figs. 19 and 20, the former showing changes in dark resistance in a typical prior art cell when subjected to electrical and light fatigue, and the latter showing the reaction of one of my cells to the same fatigue conditions.

Referring first to Fig. 19, in which the ordinates represent cell resistance expressed in megohms and the abscissas represent time expressed in minutes, a typical prior art cell may start with a dark resistance of 100 megohms, and, when connected into an external circuit to which an E. M. F. is applied, say, of 40 or 50 volts, D. C., the dark resistance will drop over a period of four minutes to possibly 10 megohms. If at this time the cell is subjected to the light intensity found in ordinary room light (approximately 10 foot candles), the dark resistance may drop by a factor of 4 or 5 due to the photoelectric effect, and, thereafter, while the cell is being irradiated, there will be a general drift downward of the cell resistance. Upon removing the light source, the cell resistance will again rise; but, even with it disconnected from the external circuit and the source of E. M. F., the cell will ordinarily not return to its original dark resistance, and, if it does, it is only after a lapse of a long period of time, possibly months.

This is illustrated in Fig. 19, in which the cell drops from an initial resistance of 100 megohms to, say, 10 megohms due to electrical fatigue over a period of four minutes, and at which time the cell is subjected to a light source which may drop its resistance to 2 megohms. The scale employed in Fig. 19 does not permit the subsequent drift downward of resistance due to light fatigue to be shown very clearly, but it will be evident from this figure that, when the light source is removed and the E. M. F. still applied, after a period of two minutes the resistance of the cell still remains at its relatively low value of less than 10 megohms.

By way of contrast, my cell, when properly made, shows substantially no drop in dark resistance when connected to an external circuit and source of E. M. F., as indicated by the portion 132 of the graph shown in Fig. 20. The cell may have an initial dark resistance of 20 megohms, and, when subjected to room light of 10 foot candles after a period of four minutes, as indicated at 133 (it could be after the elapse of any period of time), the resistance of the cell may drop due to the photoelectric effect to a value of 2 megohms, as indicated at the point 134. Continued application of the light source for any period of time, here shown as two minutes, does not lower the resistance of the cell below that which was reached due to the photoelectric effect, which means, in other words, that the cell does not exhibit a fatigue effect due to the light source. Actually, some cells have shown substantially no light fatigue when subjected to light intensities up to 1000 foot candles.

Upon removing the light source, as indicated at 135 and with a direct current E. M. F. still applied, the resistance of the cell under ordinary conditions immediately rises to its original dark resistance value of 20 megohms, although some cells will first rise to a resistance of possibly 18 or 19 megohms and return to the original dark resistance value of 20 megohms within a period of three or four minutes. This slightly delayed return of some cells to their original dark resistance value is indicated by the dotted line 136 in Fig. 20.

Summarized, it may be said that my cell is generally characterized with regard to stability by exhibiting neither electrical fatigue nor light fatigue under the conditions heretofore discussed, and in both of these respects the cell has marked advantages over thallous sulfide cells heretofore known.

Dark resistance

When thallous sulfide photocells are to be used with alternating current amplifiers, it is important for their dark resistance to be low enough to match properly the input impedance of the amplifier. Normally, a dark resistance of less than 30 megohms is desirable for this reason, and a dark resistance of less than 5 megohms is even more desirable. Prior art thallous sulfide cells, due to their method of fabrication and preparation, have had dark resistance values which ordinarily ran between 100 megohms and 500 megohms, but I have been able to produce photocells by my method which have the required sensitivity and still have a dark resistance within the ranges necessary for proper use with A. C. amplifiers. The particular grid which I employ in my cell, as heretofore described, in conjunction with controlled activation of the thallous sulfide are factors in achieving the low dark resistance which characterizes my cell.

Frequency response

A photocell made in accordance with my invention has its best response to relatively low frequencies on the order of 100 cycles or less, although the cell will respond up to as high as 5,000 cycles. The frequency response of the cell may, however, be greatly enhanced by using, instead of a plurality of grid lines, only a pair of such lines and concentrating the light source on this reduced target area. Preferably, the two grid lines should be separated a distance of approximately 1 millimeter and should not be overlapped more than a few millimeters, the exact amount of overlap depending upon the shape of the image to be received.

Noise factor

Another of the outstanding advantages of my cell is its relatively low noise level. I have found that the noise factor or level may be held to a minimum by using appropriate materials and technique for applying the grid to the cell. For example, I have found that forming my grid of Aquadag, as hereinbefore described, produces a cell with substantially lower noise level than a cell having a grid ruled with a lead pencil. Gold and platinum grids also produce a relatively low noise factor but are not as desirable as Aquadag due to their unfavorable affinity for the photosensitive covering.

By using Aquadag to form the conducting lines of the grid and to connect the grid with the electrodes, I have been able to produce cells which have a noise factor approaching that due to thermal effects alone; i. e., noise due to the thermal agitation of the atoms themselves, although the noise level is somewhat dependent on the amount of current flowing through the cell.

Since the cell of my invention has a relatively high sensitivity and low noise factor, obviously I am able to produce one having a very desirable signal to noise ratio.

Directional response

In the form of the invention shown in Fig. 8, the photo-sensitive element is so located that the cell is responsive to radiations from all sides of the cell. It is only when radiations emanate and travel along the axis of the cell and have no components which strike the cell at an angle to its axis that the cell is unresponsive to such radiations. Obviously, there may be slightly greater responsiveness of the cell when the radiations emanate from a point directly in front of or in rear of the cell, as viewed in Figs. 8 and 9, as distinguished from those emanating from the sides thereof due to the fact that greater area is exposed to such radiations; but, even so, the tube will respond to all such radiations, assuming they carry sufficient energy to be effective in the particular circuit to which the cell is connected.

*Linearity of response*

In common with all photo-resistive cells, response of the cell is non-linear with light intensities. However, the cell does not saturate in direct sunlight.

One difficulty inherent in the method of making a photocell as disclosed above, which will be referred to as my earlier process, was the unreliability of the method in producing photocells having a uniformly high standard of physical characteristics. For no apparent reason, some photocells produced by said method would be less stable than others or of lower sensitivity even though identical procedure had been followed in the preparation of all of the cells. Although uniformly good results could be obtained by following this method when making photocells having, for example, a high signal to noise ratio, it was not possible to produce photocells of a supersensitive type with any degree of regularity.

I have provided a solution to this problem so that photocells of a highly sensitive character may be regularly and uniformly produced and I have also made other simplifications in the method of fabrication so that the method, as a whole, is adapted to mass production on a commercial basis.

The fundamental discovery which I have made in the simplification and in improving my earlier process for making thallous sulphide photocells as described above consists in the realization that the activation of the thallous sulphide should be accomplished in the presence of a catalyst, such as the vapors of water, alcohol, dioxane, carbon disulphide, hydrogen peroxide, or their equivalents. Just how these vapors assist in the activation of the thallous sulphide is not definitely known although it appears that they are adsorbed by the top layer of the thallous sulphide and affect both the rate and the character of the oxidation. At the present time, it appears that, generally speaking, any vapor, the molecules or atoms of which are characterized by having loosely bound electrons; i. e., molecules or atoms which have unshared electrons, would be appropriate catalysts. In any event, I have definitely established that when the above-named materials are present during the activation process, not only can uniformly good results be obtained, but also the cells produced by this method have amazingly high sensitivity.

There are other benefits which flow, directly or indirectly, from this basic discovery. For example, I have found that it is not necessary to exercise some of the precautions which have heretofore been believed essential or desirable in the preparation of the thallous sulphide. In my earlier process, described above, it has been pointed out that after the thallous sulphide has been precipitated, filtered and washed, it should be stored in an evacuated desiccator over $P_2O_5$ to dry, after which the black $Tl_2S$ powder is fused in vacuum and when cold, crushed in a mortar and stored in vacuum prior to use. I now find that after the $Tl_2S$ has once been dried in the desiccator in vacuum, it may then be handled in the air for relatively long periods of time (two weeks, by way of example) without harmful results provided the oxides are removed by separating them from the pure $Tl_2S$ when the powder is melted down prior to being stored in vacuum. When melted down, the pure $Tl_2S$, because of its greater specific gravity, will fall to the bottom and a darker liquid consisting mainly of the oxides will remain on top. When the molten mass has solidified, the two materials may be readily separated to obtain pure $Tl_2S$.

The fact that the thallous sulphide may be exposed for long periods of time after it has once been dried is an amazing fact since it has heretofore been considered extremely harmful to permit oxidation of the thallous sulphide to take place in the open air for any appreciable length of time; i. e., more than a matter of minutes. While it is true that thallous sulphide will oxidize and become unsuitable for use in a photocell if permitted to remain in the open air for any appreciable length of time, I have found that when the oxides are removed, after such exposure, by fusing the mass and then physically separating the oxides from the thallous sulphide after solidification, as described above, the thallous sulphide thus separated is well suited for use in a photocell and will produce highly sensitive cells.

Another advantage of my improved later method consists in the elimination of a mercury diffusion pump, liquid air traps and special equipment for introducing chemically pure dry oxygen into the cells. I now find it satisfactory to employ an oil vacuum pump, of conventional type, capable of producing a vacuum of two hundred microns, or less, preferably on the order of ten microns. Also, instead of using chemically pure dry oxygen for the activation of the thallous sulphide, I find it entirely satisfactory to introduce the oxygen in the form of ordinary air provided it has a sufficient moisture content to provide the necessary quantity of water vapor to produce satisfactory results. Air having a relative humidity of forty per cent, for example, has been found satisfactory. Of course, I may use pure oxygen to which water vapor or some other suitable catalyst has been added.

The substitution of air for the activating material may be accomplished by eliminating the oxygen flask 112 and the special valve employed for introducing oxygen into the system and substituting therefor an ordinary stopcock in the arm 120 so that by a quick manipulation of the stopcock, a limited amount of air may be introduced into the manifold 101 at the proper time.

In carrying out my improved process, I may first bake the cell in the open air for a period of about ten minutes at 500° C. and in this respect, the improved process differs from the process disclosed in my earlier application wherein the preliminary baking out of the cell was done while under a high vacuum. Although a vacuum may be used, it is not essential. The thallous sulphide is then deposited or formed upon a suitable surface within the envelope, as described in my earlier process. The activation of the thallous sulphide is then accomplished by heating the cell to a temperature of around 225° C. and then quickly opening and closing the stopcock in the arm 120 to admit a small quantity of air to the manifold 101. This is done while the vacuum pump is connected to the manifold and the pump is allowed to operate until the cells are brought down to about one or two millimeters of mercury.

Successive repetition of this step; i. e., the heating of the cells to a temperature of about 225° C., admitting a small quantity of air, and then pumping the cells down to a pressure of one or two millimeters of mercury, has the effect of lowering the dark resistance of the cells for each repetition of the step while still maintaining high sensitivity and other desirable physical characteristics of the cell. For example, with one or two repetitions of the step, it is possible to produce a highly sensitive photocell having a dark resistance of from one to five megohms.

After pumping the cells down to one or two millimeters of mercury following the last performance of the above step, the stopcock 127 is then closed, disconnecting the pump from the manifold and the cells, and the cells are baked at 225° C. for approximately ten minutes, after which the stopcock 127 is again opened, permitting the vacuum pump to reduce the pressure in the cells to a value of approximately one hundred microns. The cells are continually heated to 225° C. during the latter pumping out operation. The temperature of 225° C. at which the cells are activated is not critical. In general, the higher the temperature, the greater will be the dark resistance of the cell.

Many variations of the process are possible once the importance of a catalyst is realized. In the first place, the temperatures at which the activation is made to take place becomes less critical although even with the catalyst, it still appears to be true that the higher the temperature at which the activation takes place, the greater will be the dark resistance of the cell. The pressures required for successful operation of the process are also less critical when a catalyst is used. The important thing is to produce limited oxidation and activation of the thallous sulphide and it is relatively unimportant whether the oxygen is introduced in fairly large quantities, relatively speaking, and then pumped out when sufficient oxidation has taken place, or whether smaller quantities of oxygen are introduced successively, as herein disclosed, or whether the precise amount of oxygen required for the cell is introduced and sealed into the cell for complete reaction with the thallous sulphide. The fact is that when a suitable catalyst, such as those heretofore named, and their equivalents are present when the activation takes place, the desired physical characteristics of the cell may readily be obtained with uniform regularity.

The cells produced by this improved method have the desired sensitivity and stability although there is generally a shift in dark resistance to lower values for a few days after the cells have been made, after which the dark resistance of the cells remains constant. One possible explanation is that the activated thallous sulphide acts as a getter for the remaining oxygen within the cell at the time of sealing off and that as soon as the oxygen has become completely used up in reacting with the thallous sulphide, the cell stabilizes and thereafter gives uniform results.

I have also found that it is possible to produce excellent cells by sealing them off with approximately one millimeter of pressure after activation, as described above. As far as can be determined, it appears that it is the limited activation of the thallous sulphide in the presence of a catalyst and heat which is essential for producing supersensitive cells and that limited activation of the cells may be accomplished in various ways if water vapor, or its equivalent, and heat are both present.

The falling off of the dark resistance until a stable value has been reached when cells are sealed off with a small gas pressure does not, curiously enough, materially affect the sensitivity of the cell and actually has the advantage of reducing the noise factor of the cell.

Cells made by the improved process herein described may readily be constructed to have a dark resistance of from one to ten megohms and a sensitivity factor (as hereinbefore defined) of twenty or more. In some instances, a sensitivity factor as high as thirty-seven has been attained.

Throughout this specification, it has been assumed that the end product of the two methods of preparing thallous sulphide, as described in conjunction with my earlier process was $Tl_2S$. Actually, it may vary slightly from chemically pure $Tl_2S$, and from this standpoint may be regarded as a thallium-sulphur solution in which there may be a slight excess of either thallium or sulphur. The specification and claims should, therefore, be construed accordingly.

The expression in the appended claims that the photosensitive material is "formed as a deposit in the cell under controlled oxidation conditions and maintained in its activated state by not thereafter subjecting it to uncontrolled oxidation" or words of similar import is intended to mean that the photosensitive material is in the form of a deposit in the cell; that it is activated either during or after the forming of the deposit; and that during the deposition and thereafter the material is under controlled oxidation conditions.

I claim:

1. The method of activating thallous sulphide which consists in forming a deposit of thallous sulphide on a surface, and causing it to have a limited reaction with oxygen while maintained under partial vacuum in the presence of a catalyst and while under the influence of heat, and then sealing the activated material from the atmosphere without thereafter subjecting it to uncontrolled oxidation.

2. The method of activating thallous sulphide which consists in forming a deposit of thallous sulphide on a surface, and subjecting it to a limited quantity of moist air while under the influence of heat, and then sealing the activated material from the atmosphere without thereafter subjecting it to uncontrolled oxidation.

3. The method of activating thallous sulphide which consists in forming the thallous sulphide in a container maintained under vacuum, admitting a limited quantity of oxygen and water vapor to the container, then causing a limited oxidation of the thallous sulphide to take place by the application of heat, and then sealing the activated material from the atmosphere without thereafter subjecting it to uncontrolled oxidation.

4. The method of activating thallous sulphide which consists in placing a quantity of thallium sulphide in an enclosure under high vacuum, admitting a limited quantity of oxygen and water vapor to the enclosure and heating the enclosure to cause a reaction to take place between the thallium sulphide and the oxygen at an elevated temperature, and then sealing off the enclosure at a sub-atmospheric pressure.

5. The method of processing a thallium sulphide cell to make it photosensitive which comprises the steps of first forming a deposit of thallous sulphide on a surface within the cell while continually maintaining the cell under high vacuum, admitting oxygen and a catalyst to the cell, then causing limited oxidation of the thallous sulphide to take place in the presence of the catalyst and under the influence of heat, and then sealing off the cell without thereafter subjecting the sensitized material to uncontrolled oxidation.

6. The method of preparing a photocell having an envelope enclosing a photosensitive element which consists in evacuating the envelope, forming a deposit of thallous sulphide on the element within the envelope, admitting a limited quantity of oxygen and water vapor to the envelope, then causing the oxygen to react with the thallous sulphide while under the influence of heat, thereby to photosensitize the thallous sulphide, and then sealing off the cell without thereafter subjecting the sensitized material to uncontrolled oxidation.

7. The method of preparing a photocell having an envelope enclosing a photosensitive element which consists in evacuating the envelope, forming a deposit of thallous sulphide on the element within the envelope, admitting a limited quantity of oxygen to the envelope, then causing the oxygen to react with the thallous sulphide in the presence of a catalyst while under the influence of heat, then at least partially evacuating the envelope to reduce the amount of excess oxygen within the envelope, and then sealing off the cell without thereafter subjecting the sensitized material to uncontrolled oxidation.

8. A photo-conductive cell having a photosensitive element composed of activated thallous sulphide formed as a deposit in the cell under controlled oxidation conditions and in the presence of a catalyst, and maintained in its activated state by not thereafter subjecting it to uncontrolled oxidation, said cell being characterized by having a stable dark resistance of less than ten megohms and a sensitivity factor of twenty or more.

9. The method of making a thallium sulphide photocell having a relatively high sensitivity and a dark resistance of less than ten megohms which consists in forming a deposit of thallous sulphide on a surface within the envelope while maintaining the envelope at a relatively low pressure, admitting a limited quantity of oxygen and vapor to the envelope, subjecting the envelope to heat and concurrently reducing the pressure in the envelope, and repeating said latter steps of admitting limited quantities of oxygen and vapor to the envelope, subjecting it to heat and thereafter reducing the pressure in the envelope until the desired dark resistance value of the photocell has been achieved, and then sealing off the cell without thereafter subjecting the sensitized material to uncontrolled oxidation.

10. The method of preparing pure thallous sulphide for use as a photosensitive element which consists in precipitating thallous sulphide from a thallium salt solution, thoroughly drying the thallous sulphide under vacuum, then exposing the thallous sulphide to the open air for a matter of hours to cause oxidation to take place, then fusing the thallous sulphide to cause physical separation to take place between the pure thallous sulphide and the oxides thereof by the difference in the specific gravity between the pure thallous sulphide and such oxides, solidifying the mass thus formed and then physically removing the top layer of oxides from the pure thallous sulphide.

11. The method of activating thallous sulphide which consists in causing it to have a limited reaction with oxygen in the presence of a vapor and while under the influence of heat, and maintaining it in such activated state by not thereafter subjecting it to uncontrolled oxidation.

12. The method of activating thallous sulphide which consists in causing it to have a limited reaction with oxygen in the presence of a catalyst and while under the influence of heat, the catalyst being chosen from a group whose molecules or atoms are characterized by having unshared electrons.

ROBERT J. CASHMAN.

REFERENCES CITED

The following references are of record in the file of this patent:

UNITED STATES PATENTS

| Number | Name | Date |
| --- | --- | --- |
| 1,316,350 | Case | Sept. 16, 1919 |

OTHER REFERENCES

Mellor, Comprehensive Treatise on Inorganic and Theoretical Chemistry; Longmans, Green, and Co., London, England, 1924, vol. 5, page 463.